United States Patent
Perentes et al.

(10) Patent No.: US 10,028,614 B2
(45) Date of Patent: Jul. 24, 2018

(54) DEVICE FOR PRODUCING MILK FOAM

(71) Applicant: NESTEC S.A., Vevey (CH)

(72) Inventors: Alexandre Perentes, Lausanne (CH); Alfred Yoakim, St-Iegier-la Chiesaz (CH); Alexa Perrin, Savigny (CH)

(73) Assignee: Nestec S.A., Vevey (CH)

( * ) Notice: Subject to any disclaimer, the term of this patent is extended or adjusted under 35 U.S.C. 154(b) by 157 days.

(21) Appl. No.: 14/654,620

(22) PCT Filed: Dec. 19, 2013

(86) PCT No.: PCT/EP2013/077360
§ 371 (c)(1),
(2) Date: Jun. 22, 2015

(87) PCT Pub. No.: WO2014/096181
PCT Pub. Date: Jun. 26, 2014

(65) Prior Publication Data
US 2015/0305549 A1    Oct. 29, 2015

(30) Foreign Application Priority Data

Dec. 21, 2012  (EP) ................................. 12199148

(51) Int. Cl.
*B01F 3/04* (2006.01)
*A47J 31/44* (2006.01)
*A23C 7/00* (2006.01)

(52) U.S. Cl.
CPC ............. *A47J 31/4496* (2013.01); *A23C 7/00* (2013.01); *A47J 31/4485* (2013.01); *B01F 3/04453* (2013.01); *B01F 2215/0006* (2013.01)

(58) Field of Classification Search
CPC ...... B01F 7/008; B01F 15/00714; B01F 7/12; B01F 2215/0006; B01F 3/0807; A47J 31/4485; A47J 31/4496; A47J 31/542
See application file for complete search history.

(56) References Cited

U.S. PATENT DOCUMENTS

| 8,733,234 B2 * | 5/2014 | Boussemart ........ A47J 31/4489 |
| | | 99/323.1 |
| 2002/0089074 A1 * | 7/2002 | Holl ........................ C08K 3/01 |
| | | 261/92 |

(Continued)

FOREIGN PATENT DOCUMENTS

| CN | 1488310 | 4/2004 |
| CN | 1665434 | 9/2005 |

(Continued)

OTHER PUBLICATIONS

Boussemart et al. WO 2010/023312, Mar. 4, 2010.*

(Continued)

*Primary Examiner* — Erik Kashnikow
*Assistant Examiner* — Hong T Yoo
(74) *Attorney, Agent, or Firm* — K&L Gates LLP

(57) ABSTRACT

The present invention provides a device 1 for producing milk foam, which makes use of Couette flow and a high shear stress that is accordingly applied to a milk-air mixture in a gap between a housing, in particular an outer cylinder, and a rotating element rotating arranged therein. The device further comprises a milk supply circuit supplying the fluid inlet with milk and an air supply circuit supplying the fluid inlet with air, both supply circuits being independent from each other.

20 Claims, 8 Drawing Sheets

(56) References Cited

U.S. PATENT DOCUMENTS

| | | | | |
|---|---|---|---|---|
| 2008/0168907 A1* | 7/2008 | Shen | ................... | A47J 31/4485 99/294 |
| 2009/0323459 A1* | 12/2009 | Windhab | ............ | B01F 3/04269 366/105 |
| 2011/0262606 A1* | 10/2011 | Blondel | ................ | A47J 31/002 426/474 |

FOREIGN PATENT DOCUMENTS

| | | |
|---|---|---|
| CN | 102379632 | 3/2012 |
| DE | 19719784 | 7/1998 |
| DE | 202007009537 | 10/2007 |
| EP | 1716796 | 11/2006 |
| EP | 2471423 | 7/2012 |
| JP | 2010001071 | 1/2010 |
| JP | 2011019910 | 2/2011 |

OTHER PUBLICATIONS

Office Action issued in related Chinese Patent Application No. 201380066021.7 dated Apr. 19, 2017.
Japan Office Action in related Application No. 2015-548572, Dispatch No. 473591, Dispatch Date Oct. 31, 2017, 8 pages.
Chinese Office Action for Patent Application No. 201380066021.7 dated Nov. 16, 2017—5 pages.
Chinese Office Action for Patent Application No. 201380066021,7 dated Nov. 16. 2017 (English Translation)—4 pages.

* cited by examiner

DEVICE FOR PRODUCING MILK FOAM

CROSS REFERENCE TO RELATED APPLICATIONS

The present application is a National Stage of International Application No. PCT/EP2013/077360, filed on Dec. 19, 2013, which claims priority to European Patent Application No. 12199148.3, filed on Dec. 21, 2012, the entire contents of which are being incorporated herein by reference.

The present invention is directed to a device for foaming a fluid, preferably for producing milk foam. In particular the device is designed in a way that it can be positioned to produce foam in-line of a fluid flow path. The device of the present invention uses high shear energy experienced by the fluid in the device as foaming energy for producing the foam.

In the state of the art devices for producing milk foam are known, wherein the foaming of the milk is typically carried out in batch processes. For example, a device is known that has a reservoir, into which milk can be filled. A rotating part in the reservoir, for example a whisk provided at the bottom surface of the reservoir, causes the foaming of the milk. Such a device for producing milk foam, however, can produce only a predetermined amount of milk foam at the same time, i.e. in one batch process. Afterwards, the device needs to be emptied, preferably cleaned, and refilled with milk before the next batch process can be started. Furthermore, such a device cannot be implemented in-line of a fluid flow path, and thus e.g. in a device for producing or providing milk or other beverages.

Further, the state of the art includes devices that inject hot steam into milk that is filled into a reservoir, in order to cause foaming. However, such devices cannot be used in-line of a fluid flow path of e.g. a beverage producing device.

For the above-mentioned state of the art devices, the factors that influence the foaming of the milk are, for example, the geometry of the rotating part, like the whisk, or the temperature and/or pressure of the steam that is injected into the milk. These factors are difficult to understand, and are not easy to control accurately without building more complicated devices. Therefore, the milk foam of many simple state of the art foaming devices is often produced unreliably, i.e. the properties of the foam like volume, foaming level, foam stability etc. differ from one batch process to another.

The goal of the present invention is to overcome the above-mentioned disadvantages, and to improve the state of the art. In particular, the present invention has an object to provide a device for foaming a fluid, preferably for producing milk foam, which can be implemented in-line of a fluid flow path. Further, the present invention desires to provide a device, with which the foam can be produced more reliably and in a consistent manner. Therefore, the factors influencing the foaming effect should be better understandable and easier to control accurately. Another object of the present invention is to provide a simple and robust device that has a long life time.

In the following the description of the present invention is given in view of foaming of milk. However, the invention is not limited to milk as a fluid, but can also be applied to other fluids, e.g. chocolate or coffee. Consequently, other foams than milk foam can be achieved by the present invention as well.

For foaming of milk, both milk and air have to be provided in some manner as shown in FIG. 1. Optionally, the milk and/or the air can be heated. Further, some kind of foaming energy has to be provided to the milk and the air, in order to produce the milk foam. The present invention bases on the ideas that the supply of air and milk are controlled separately, and that the foaming energy is provided as a high shear energy. The high shear energy is achieved by designing the device such that a milk-air mixture is passed at least partly by Couette flow through the device.

Couette flow refers to a laminar flow of a viscous fluid in a space between two parallel plates. The basic principle of Couette flow is shown in FIG. 2. In FIG. 2 a movable two-dimensional boundary plate moves with a certain velocity u in respect to a stationary two-dimensional boundary plate. In between the two boundary plates is present a fluid. The movement of the movable boundary plate causes the fluid to move. Two boundary conditions define the movement of the fluid. Directly at the stationary boundary plate, the fluid does not move at all, due to friction forces at the stationary boundary plate. Therefore, the velocity u is zero. Directly at the movable boundary plate, friction causes the fluid to move with the velocity u of the movable boundary plate.

In a simple model, the velocity u of the fluid increases linearly in a direction y measured from the stationary boundary plate. Thereby, a shear stress $\tau$ is caused in the fluid, which depends on the distance between the two boundary plates, the viscosity of the fluid, and the absolute velocity of the moving boundary plate. The shear stress in the fluid results in a shear energy, which can be used as foaming energy. Details will be described by the present invention.

The present invention realizes the above-mentioned principle with a device according to the attached independent claims. The independent claims solve the above-mentioned problems of the state of the art. Further advantages of the present invention are developed in the attached dependent claims.

As already mentioned, a key feature of the present invention is that milk and air are provided via two separate supply circuits, i.e. a milk supply circuit and an air supply circuit. The amount of air and milk supplied can thus be separately controlled, which allows it to control the foam properties particularly well.

According to a preferred embodiment of the invention, the milk supply circuit comprises a feedback control loop with a flow meter and a regulator. Preferably, the air supply circuit equally comprises a feedback control loop with a flow meter and a regulator, for example a PID regulator.

Depending on the desired foam properties (firmness, consistency, specific weight, etc.), a different ratio of milk and air used in the foaming process can be chosen, so that a wide range of different foam recipes can be produced by the device. Typically the ratio of milk to air volume can range from 3:1 to 1:7. Target values for different milk and air flow rates corresponding to different recipes can be stored in a control unit of the device and used to regulate the flow accordingly depending on the desired recipe.

Furthermore, according to a preferred embodiment of the invention, a device for producing milk foam comprises an outer cylinder, an inner cylinder arranged concentrically within the outer cylinder, a fluid inlet and a fluid outlet, wherein the outer cylinder and the inner cylinder are rotatable with respect to each other, wherein a gap is formed between the outer cylinder and the inner cylinder, and wherein the gap connects the fluid inlet with the fluid outlet.

For instance, the outer cylinder has an inner wall and the inner cylinder has an outer wall, the inner wall and the outer wall realizing two parallel boundary plates, the relative movement of the inner cylinder against the outer cylinder causing a Couette flow of a fluid in a space between the two parallel plates.

Alternatively, the device can comprise a rotatable whisk or any other rotating element instead of the inner cylinder.

The two boundary plates shown in FIG. 2 are respectively realized by the outer wall of the inner cylinder and the inner wall of the outer cylinder. The movement of the movable boundary plate against the stationary boundary plate in FIG. 2 is caused by the relative movement of the inner cylinder against the outer cylinder. The cylinders have a common rotation axis. The distance between the boundary plates in FIG. 2 is defined by the width of the gap, through which a fluid, preferably milk and air, flows from the fluid inlet to the fluid outlet. That means milk and air are preferably provided to the fluid inlet of the device. Consequently, following the principle described in respect to FIG. 2, the milk-air mixture experiences a high shear stress in the gap.

The high shear stress leads to an emulsion of the air and the milk. As soon as the emulsified milk-air mixture leaves the gap it expands. Due to the expansion a foaming effect is achieved, since the size of air bubbles within the milk increases abruptly. Therefore, generally speaking a high shear energy contained in the milk-air mixture is used to provide the foaming energy, which is necessary to produce the milk foam.

The device is designed such that it can be positioned in-line with a flow path of the milk, since the milk can flow into the fluid inlet, through the gap, and out of the fluid outlet. The device is therefore suited to continuously receive milk from a reservoir and convert it into milk foam.

Factors that influence the milk foam properties are e.g. the width of the gap, the tangential speed of the cylinders with respect to each other, the cylinder surface and the time during which the milk is exposed to the shear stress, i.e. the time spent in the device. Such parameters are easy to understand and can be controlled precisely. Moreover, the device can be designed rather simple, but can still produce very reliable results.

Preferably, a width of the gap, for example in the radius direction of the inner cylinder and the outer cylinder is in a range of 0.2 to 1.0 mm, even more preferably in a range of 0.3 to 0.6 mm.

As has been stated above, the shear stress experienced by the milk-air mixture in the device depends largely on the width of the gap that is formed between the two cylinder walls. Here the gap diameter is chosen such that a shear stress is achieved, which yields an optimal foaming effect of the milk. That means, for instance, that the foaming effect leads to milk foam having optimal properties. When referring to properties of the foam, the present invention understands e.g. a desired volume, good foam stability and/or a sufficient foaming level. Stability is defined by the amount of time the milk foam is stable, i.e. substantially keeps its volume. The foaming level is defined by a ratio of the volume of the milk fed into the fluid inlet to the volume of the milk foam dispensed out of the fluid outlet.

Preferably, the fluid outlet has a diameter that is larger than the width of the gap, preferably in a range of 2 to 10 mm.

The broadening of the fluid outlet compared to the width of the gap leads to the expansion of the milk-air emulsion produced by the high shear stress resulting from the relative rotation of the two cylinders. The expansion increases the size of air bubbles within the milk-air mixture, and thus causes a foaming effect. The preferred diameter of the fluid outlet causes an expansion that achieves milk foam with optimal properties.

For the embodiment using a rotating cylinder, the inner cylinder can comprise a first part having a larger diameter and a second part having a smaller diameter, the gap being formed between the first part of the inner cylinder and the outer cylinder, and a chamber being formed between the second part of the inner cylinder and the outer cylinder.

The offset between the two cylinders creates a first zone (in this case the gap) between the two cylinders, where the milk-air mixture experiences higher shear stress, and a second zone (in this case the chamber) between the two cylinders, where the milk-air mixture experiences lower shear stress. The high shear zone is used for emulsification of the milk-air mixture, whereas the low shear zone is used for expansion of the emulsification. Thereby, the foaming effect can be generated between the two concentric cylinders. If further the fluid outlet is even lager in diameter than the chamber between the two cylinders, a further expansion and foaming effect can occur. The device could even be designed such or means could be provided in the device, so that the chamber diameter is adjustable. Thus, the foaming effect and the properties of the milk foam could be controlled and adjusted.

Preferably, for the embodiment using a rotating cylinder rather than a whisk or another rotating element, the chamber has a width in the radius direction of the inner cylinder and the outer cylinder in a range of 2 to 10 mm.

With the preferred values for the chamber width, the optimal foam properties can be achieved within the device.

Preferably, the device further comprises a motor for rotating the rotating element with respect to the outer cylinder.

Preferably, the motor is adapted to rotate the inner cylinder with a rotation speed in a range of 4000 to 8000 rpm with respect to the outer cylinder.

The shear stress between the rotating element and surrounding walls depends on the movement velocity, i.e. the relative rotation speed. The preferred values for the rotation speed have been found to yield the best foaming effect. That means the generated milk foam has the optimal properties.

Preferably, the motor comprises a shaft provided with a head part that comprises at least one first magnet, the rotating element comprises at least one second magnet, and the at least one first magnet and the at least one second magnet are adapted to contactlessly transfer a rotation of the motor shaft onto the rotating element, i.e. for example an inner cylinder or a whisk.

Due to the fact that the rotating element is driven magnetically, the shaft does not need to be mechanically connected to or inserted into the inner cylinder. Therefore, less friction will occur in the device, since no friction between the shaft and a guiding to or into the rotating element exists for rotating of the device. Less friction results in less energy consumption and a longer life time of the device.

Preferably, the device further comprises a water-impermeable separation element arranged between the motor and the rotating element.

The water-impermeable separation of rotating element and the motor is possible due to the magnetic coupling that transfers the rotation of the shaft onto the rotating element. The risk that milk enters from the gap into the part of the device, in which the motor is housed, is more or less eliminated. The motor thus requires less cleaning, since it is not contaminated with milk, and has also a longer expected life time. Preferably, the separation element is made of metal or plastic. The separation element can be part of a housing of the device.

Preferably, a diameter of the outer cylinder or housing is in a range of 25 to 35 mm, preferably about 30 mm.

For the embodiment using an inner rotating cylinder, the total volume of the gap defined between the two cylinders, which depends not only on the width of the gap but also on the absolute diameters of the two cylinders, yields the desired amount of milk foam per time, when the device is operated. Similarly, when a whisk is used as a rotating element, the volume of the gap formed above, below and around the whisk is crucial.

Preferably, the device further comprises a heater for heating fluid flowing from the fluid inlet to the fluid outlet. Heating of the milk and/or air provided via the fluid inlet into the gap can enhance the foaming effect due to additional available energy and/or protein denaturation. Further, hot milk foam is typically desired for preparing beverages like cappuccino or the like. The heater is preferably integrated within the housing, i.e. the outer cylinder.

The invention also relates to a method for producing milk foam in a device as described above. The method comprises supplying milk to the fluid inlet via the milk supply circuit and supplying air to the fluid inlet via an air supply circuit that is independent from the milk supply circuit.

Another aspect of the invention relates to a use of milk as milk to be frothed by a device as described above.

In the following the present invention is described in more detail with reference to the attached figures.

Although the milk and air supply circuits are part of the device according to the invention, they are not shown in FIGS. 3 to 7 for reasons of simplicity.

Figure 1:
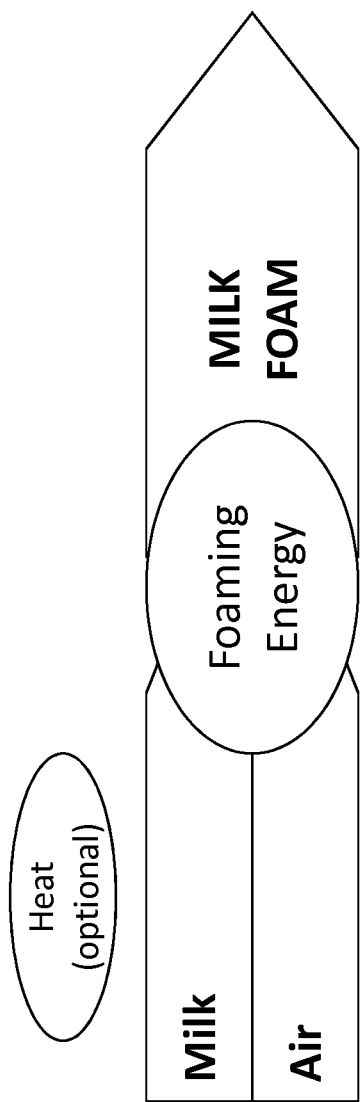
FIG. 1 shows schematically a basic principle for producing milk foam.
Figure 2A:
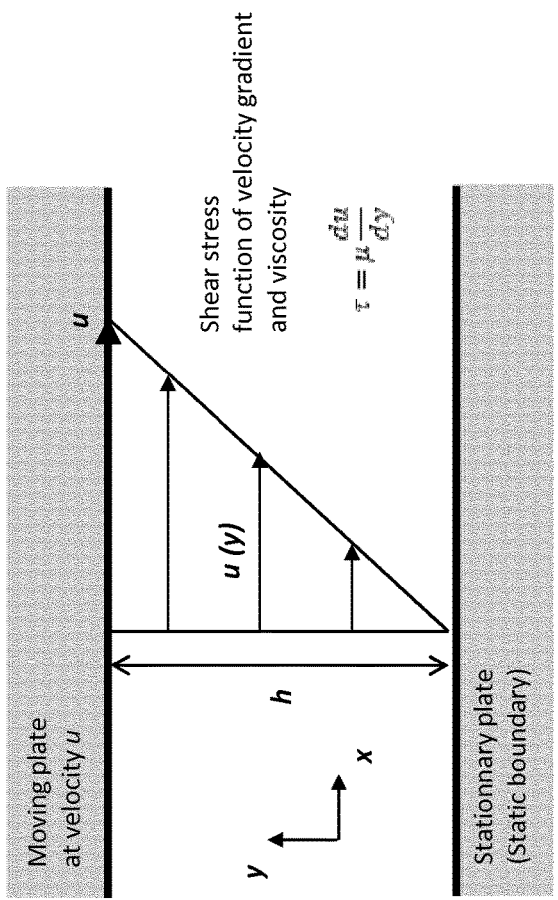
FIGS. 2a and 2b show schematically a basic principle of Couette flow for generating shear stress.
Figure 2B:
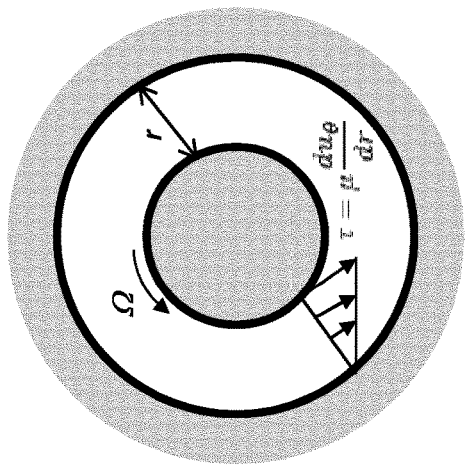
Figure 3:
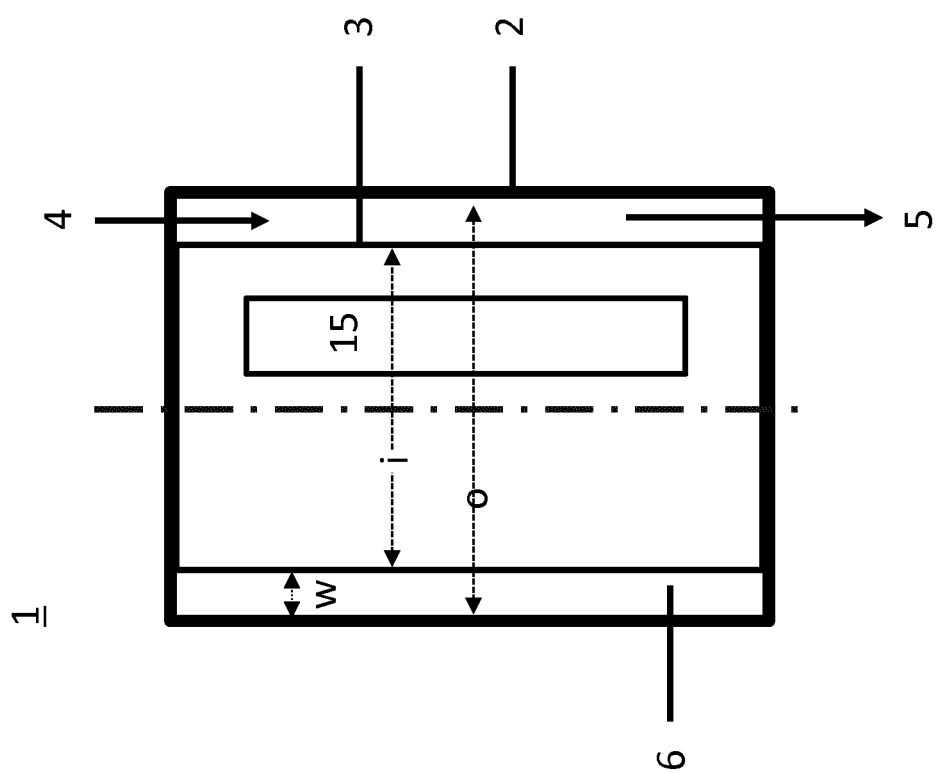
FIG. 3 shows a schematic view of a device for producing milk foam according to a first embodiment of the present invention.

FIG. 3 shows schematically a device 1 for producing milk foam according to a first embodiment of the present invention. The device 1 comprises an outer cylinder 2, which is at least partly hollow, wherein the hollow defines an inner diameter o of the outer cylinder 2. Inside of the outer cylinder 2, i.e. inside the hollow, is arranged an inner cylinder 3 concentrically with the outer cylinder 2. The inner cylinder 3 has an outer diameter i. The outer cylinder 2 and the inner cylinder 3 are rotatable against each other around a common rotation axis. To this end, preferably the inner cylinder 3 is rotatable around the rotation axis, which is indicated in FIG. 3 by the broken line, i.e. the inner cylinder 3 is a rotator. The outer cylinder 2 is preferably fixed, i.e. the outer cylinder 2 is preferably a stator. The outer cylinder can e.g. be held fixed in a beverage producing device, which includes the device for producing milk foam of the present invention. Alternatively, the outer cylinder 2 can be a housing of the device 1 of the present invention, which can be held fixed by its own weight or the weight of the device 1 when e.g. standing on a surface. However, other solutions are possible, for example, that the outer cylinder 2 is rotated against a fixed inner cylinder 3 or that both cylinders 2 and 3 are rotated against each other.

The outer diameter i of the inner cylinder 3 is smaller than the inner diameter o of the outer cylinder 2, so that a gap 6 is formed between the cylinders, which has a width w that is defined by the difference of the respective cylinder diameters (i.e. $w=o-i/2$). The gap 6 connects a fluid inlet 4 of the device 1 with a fluid outlet 5 of the device 1 in a way that a fluid, e.g. milk provided together with air, can pass through the device 1. That means in use of the device 1, preferably milk and air are entered into the fluid inlet 4, the mixture then flows through the gap 6 along the extension direction of the two cylinders 2 and 3 (i.e. the height of the cylinders), and finally exits the device 1 through the fluid outlet 5.

Since the inner cylinder 3 is rotated with respect to the outer cylinder 2, while the milk-air mixture flows through the gap 6, the mixture experiences a high shear stress according to the principles of the Couette flow explained above. The high shear stress causes an emulsion of the milk and the air. After the emulsion flows out from the gap 6 and of the device 1 through the fluid outlet 5, the emulsion expands and is thereby foamed, because air bubbles within the milk expand abruptly. Preferably, the width w of the gap 6, as measured in the direction of the radius of the inner cylinder 3 and the outer cylinder 2, respectively, is in a range of 0.1 to 1 mm, more preferably 0.2 to 0.6 mm, most preferably 0.3 to 0.5 mm. With such a gap the best foam properties for milk foam are achieved.

The inner cylinder 3 can be solid or hollow. The inner cylinder 3 can include a heater 15, which is adapted to heat the milk and the air flowing through the gap 6. Alternatively, the heater can be arranged in the outer cylinder and thus heat the milk and the air flowing through the gap 6 from the outside. The heater 15 can be provided with electricity or it can include parts that move due to the rotation of the rotating cylinder, and are designed to convert the movement into heat.

Figure 4:
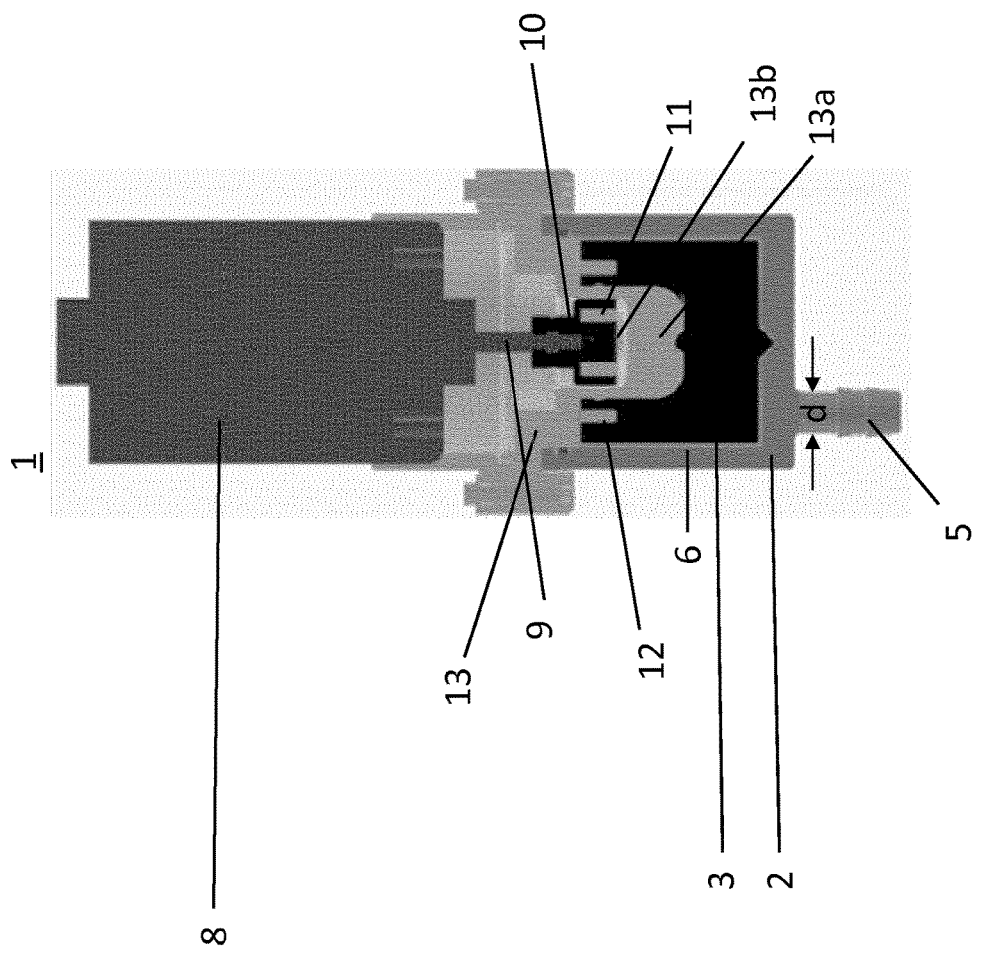
FIG. 4 shows a cross section of a device for producing milk foam according to a first embodiment of the present invention.

FIG. 4 shows the device 1 of FIG. 3 in a cross-sectional view. The inner cylinder 3 is located within the outer cylinder 2, and the gap 6 is formed between the cylinders 2 and 3, through which the milk-air mixture can flow and exit at the fluid outlet 5. The fluid outlet 5 preferably has an inner diameter d that is substantially larger than the width w of the gap 6. Preferably, the diameter d is in a range of 1 to 20 mm, more preferably 2 to 10 mm, most preferably 5 to 10 mm. A ratio of the width of the gap 6 to the diameter d of the fluid outlet is preferably between 1:1 and 1:200, more preferably between 1:3 and 1:50, most preferably between 1:5 and 1:30. Due to the expansion of the milk-air mixture flowing out from the gap 6 into the fluid outlet 5, air bubbles within the milk increase in size, whereby a foaming of the milk is caused. Thus, the device 1 can provide milk from at its fluid outlet 5.

FIG. 4 also shows that the device 1 comprises a motor 8, which is adapted to cause the rotation of the inner cylinder 3 with respect to the outer cylinder 2. The motor 8 is preferably provided separately to the two cylinders 2 and 3 e.g. in a separate chamber of the device 1 or at least with a separation 13, e.g. a plate, between the motor 8 and the cylinders 2 and 3. The separation 13 is preferably water impermeable, so that milk cannot enter the part of the device 1, in which the motor 8 is located. The motor 8 has preferably a shaft 9, which is rotated. The shaft 9 is preferably provided with a head part 10, which is wider than the shaft 9 and includes at least one first magnet 11. The separation 13 between the motor 8 and the inner cylinder 3 preferably comprises a protruding portion 13a, in which a recess 13b for receiving the head part 10 of the motor 8 is formed. The protruding portion 13a of the separation 13 is preferably received by a recess on the top surface of the inner cylinder 3. The inner cylinder 3 is preferably provided with at least one second magnet 12 arranged near its top surface, which is configured and positioned such that it interacts magnetically with the at least one first magnet 11 arranged in the head part 10 of the motor 8.

When the shaft 9 is rotated by the motor 8, the at least one first magnet 11 is also rotated and transfers its rotation through the magnetic coupling onto the at least one second magnet 12 of the inner cylinder 3. Thus, the rotation of the inner cylinder 3 with respect to the outer cylinder 2 is caused.

Preferably, the relative rotation speed of the two cylinders 2, 3 against each other is in a range of 1000 to 15000 rpm, more preferably 2000 and 10000 rpm, most preferably 4000 and 8000 rpm. With the preferred rotation speed the best emulsification of the air-milk mixture in the gap 6 is achieved, and the best foaming properties of the milk foam are realized after expansion. Due to the contactless transfer of the rotation of the motor shaft 9 to a rotation of preferably the inner cylinder 3, the part of the device 1, which includes the motor 8, can be separated from the part of the device 1, which includes the two cylinders 2, 3. This separation avoids that milk enters the part of the device 1, which includes the motor 8. The milk could harm the electrical or mechanical parts of the motor 8. Thus, by decoupling the two parts of the device 1, a longer life time is achieved. Further, the parts of the motor 8 are not contaminated with milk, and thus need not necessarily be cleaned very often.

Figure 5:
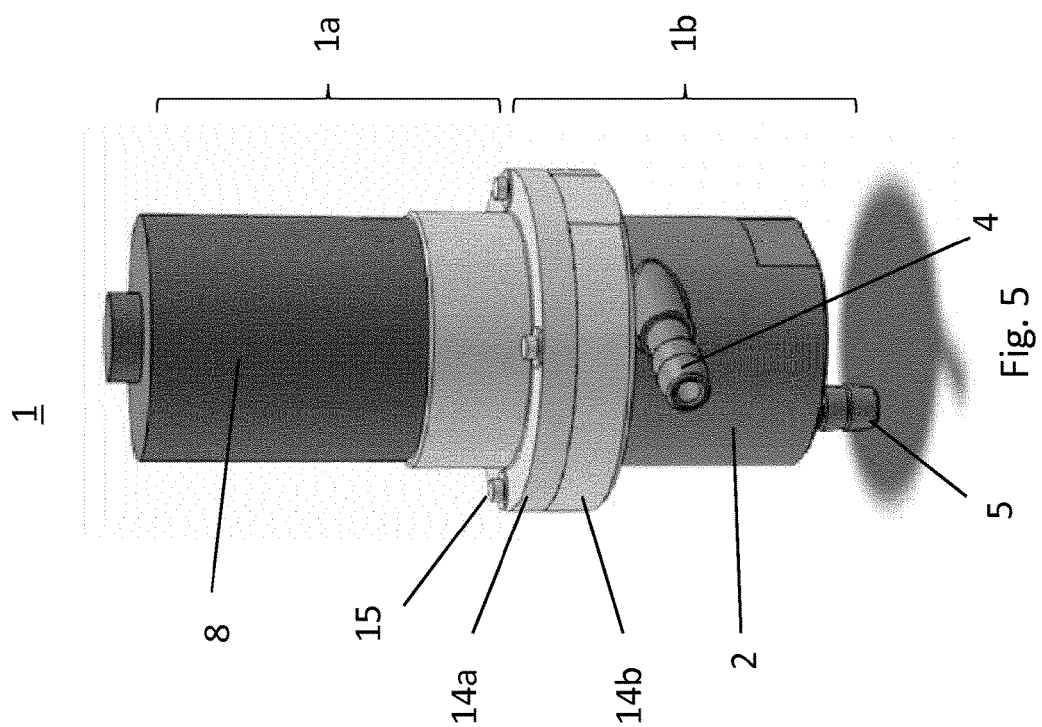
FIG. 5 shows a perspective view of the device for producing milk foam of FIG. 4.

FIG. 5 shows the device 1 of FIGS. 3 and 4 in a perspective view. The device 1 comprises two parts, an upper part 1a that includes the motor 8 and a lower part 1b that includes the two cylinders 2 and 3. The two parts 1a and 1b of the device 1 are preferably coupled together by two flanges 14a and 14b, and are fixed with screws 15 as shown in FIG. 5. An upper flange 14a can be designed to hold the motor 8 of the device 1, and a lower flange 14b can be designed to hold the cylinders 2 and 3 of the device 1. The upper flange 14a can also be produced integrally with a housing of the motor 8, and the lower flange 14b can be produced integrally with the outer cylinder 2. At least the lower flange 14b acts as the separation 13 of motor 8 and cylinders, as can be gathered from FIG. 4. The fluid inlet 4 is preferably arranged on an outer side surface of the outer cylinder 2, and can be produced integrally with the outer cylinder 2. The same is true for the fluid outlet 5, which is preferably arranged on an outer bottom surface of the outer cylinder 2, and is preferably produced integrally with the outer cylinder 2.

Both the fluid inlet 4 and the fluid outlet 5 are preferably designed to attach two fluid lines coming from a milk supply circuit and an air supply circuit, such as tubes. The device 1 can then e.g. be integrated into a beverage producing device having e.g. pumps to provide milk and air to the fluid inlet 4. Alternatively, the device 1 itself can be provided with a mechanism so that a relative rotation of the cylinders 2 and 3 causes milk and air to be sucked into the fluid inlet 4, e.g. via a tube leading into an external milk reservoir. Through the fluid outlet 5 the milk foam can be provided directly, or can be provided via a tube to a dispenser. The device 1 of the present invention can thus provide milk foam in-line of a flow path of the milk, and can e.g. be part of a beverage producing device, e.g. a coffee machine.

Figure 6:
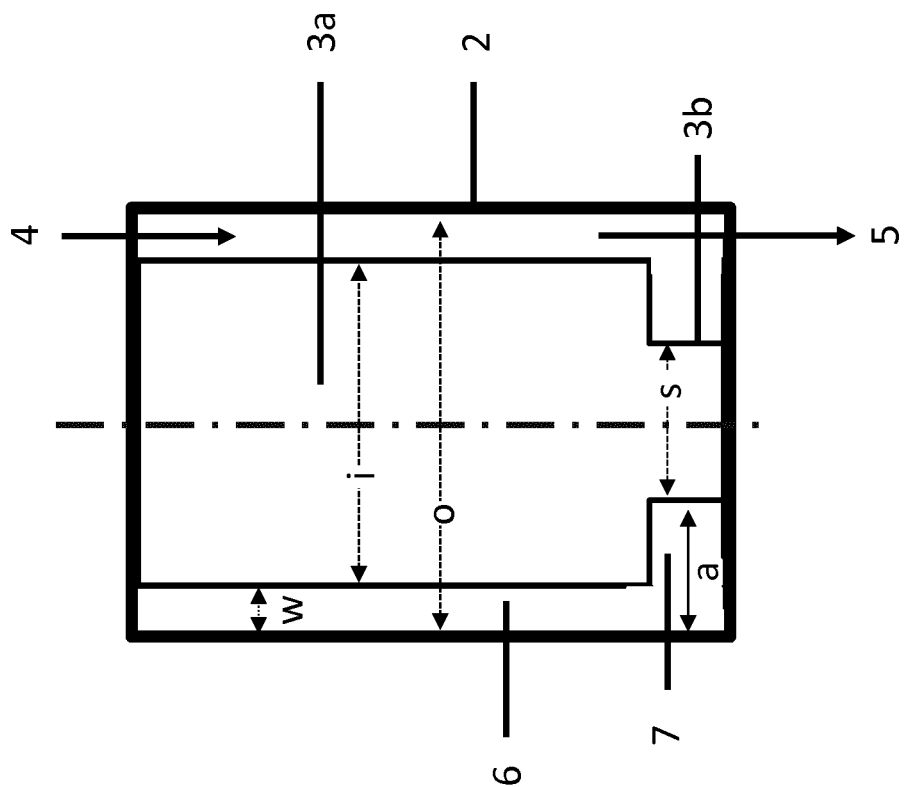
FIG. 6 shows a schematic view of a device for producing milk foam according to a second embodiment of the present invention.

FIG. 6 shows a cross section of an alternative embodiment of the device 1 of the present invention. The inner cylinder 3 comprises a first part 3a and a second part 3b. The first part 3a has diameter i that is larger than a diameter a of the second part 3b. In particular, a diameter i of the first part 3a is preferably chosen such that a gap 6 of a width w in a range of 0.1 to 1 mm, more preferably 0.2 to 0.6 mm, most preferably 0.3 to 0.5 mm is formed between a first part 3a and the outer cylinder 2. The diameter s of the second part 3b of the inner cylinder 3 is preferably designed such that a chamber 7 is formed between the second part 3b and the outer cylinder 2, wherein the chamber 7 has preferably a width measured in the radius direction of the inner cylinder 3 that is larger than the width w of the gap 6, preferably in a range of 1 to 20 mm, more preferably 2 to 10 mm. The diameter o of the outer cylinder 2 is preferably 20 to 40 mm, more preferably 30 mm as in the first embodiment of the present invention. Therefore, the diameter s of the second part 3b is most preferably in a range of 20 to 28 mm, and the diameter i of the first part 3a is most preferably in a range of 27.5 to 27.7 mm as in the first embodiment.

Milk and air provided to the fluid inlet 4 for flowing through the gap 6 are emulsified due to the high shear forces experienced in the narrow gap 6 between the inner cylinder 3 and the outer cylinder 2, when the inner cylinder 3 is rotated with respect to the outer cylinder 2. When the emulsified milk-air mixture flows out of the gap 6 into the chamber 7, it is expanded and consequently foamed. Due to the expansion, the foam is pressed out of the fluid outlet 5. If the fluid outlet 5 is even larger in diameter than the chamber 7, the milk is foamed even more.

Figure 7:
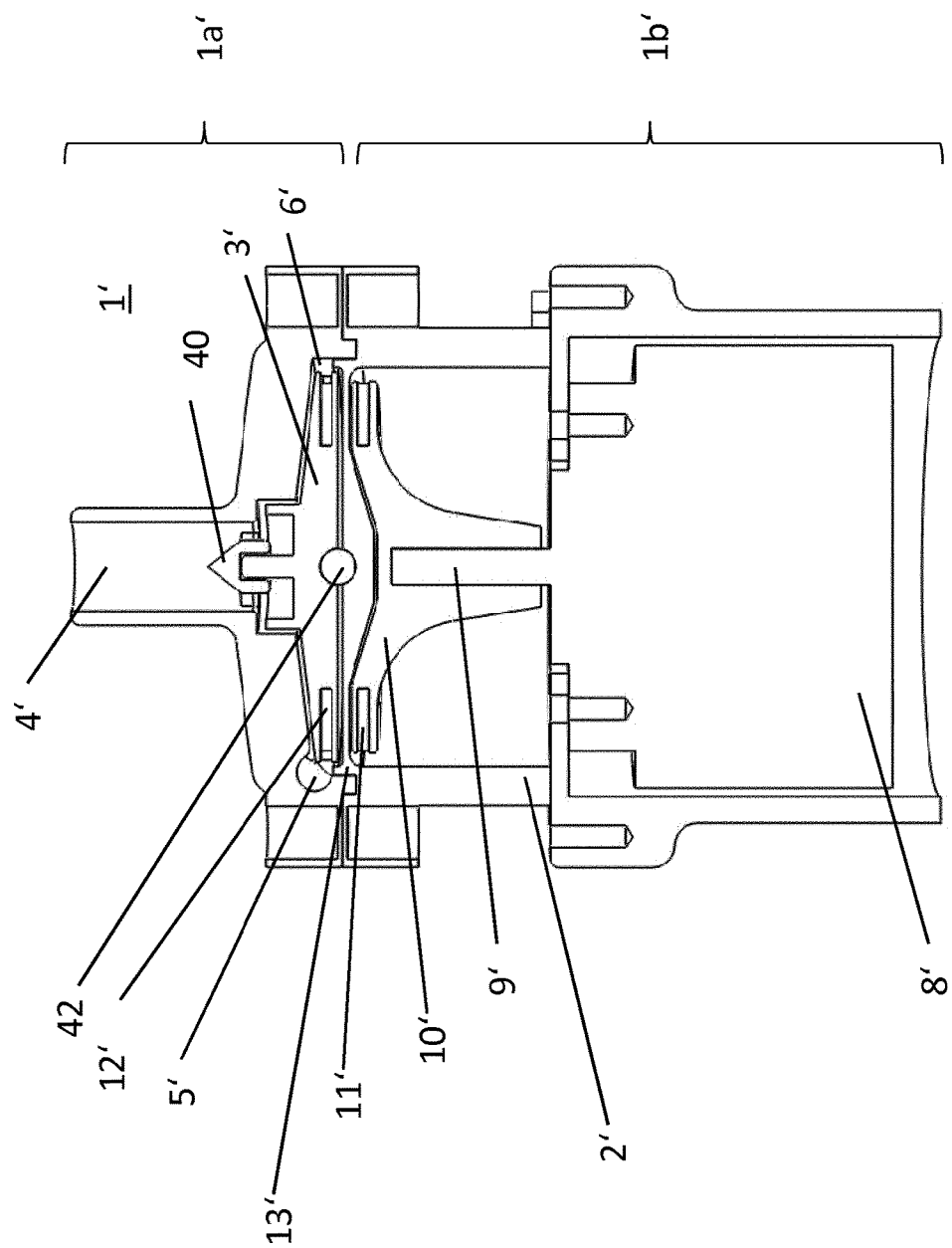
FIG. 7 shows a cross section of a device for producing milk foam according to a third embodiment of the present invention.

FIG. 7 shows a cross-sectional view of yet another embodiment of a device 1' according to the present invention.

The device 1' comprises an outer cylinder 2' forming a housing, which is at least partly hollow. In an upper part 2a' of the outer cylinder 2', a hollow compartment is formed, and a rotatable whisk 3' is arranged therein concentrically with the outer cylinder 2'. The whisk 3' has a disc-like shape with an outer diameter which is smaller than the inner diameter of the outer cylinder 2', so that a gap 6' is formed above, below and around the whisk 3'. As already explained for the previous embodiments of the invention, the gap 6' connects a fluid inlet 4' of the device 1' with a fluid outlet 5' of the device 1' in a way that a fluid, e.g. milk provided together with air, can pass through the device 1'. The fluid inlet 4 is connected to an air and a milk supply circuit, both not shown in FIG. 7. A fluid divider 40 sits insider the inlet 4' so that the milk and air entering the device 1' are evenly distributed around the whisk 3'.

Since the inner whisk 3' is rotated with respect to the outer cylinder 2' with only a narrow gap 6' around the whisk 3', while the milk-air mixture flows through the gap 6', the mixture experiences a high shear stress according to the principles of the Couette flow explained above. The high shear stress causes an emulsion of the milk and the air. After the emulsion flows out from the gap 6' and of the device 1' through the fluid outlet 5', the emulsion expands in the fluid outlet 5'. The fluid outlet 5' is arranged radially outwards of the whisk 3' and has an inner diameter which is bigger than the width of the gap 6', so that the air bubbles in the milk foam can expand therein. Preferably, the width w of the gap 6' is in a range of 0.1 to 1 mm, more preferably 0.2 to 0.6 mm, most preferably 0.3 to 0.5 mm. With such a gap the best foam properties for milk foam are achieved.

In a similar way then explained for the previous embodiments, the device can include a heater which is not shown in FIG. 7.

For this embodiment also, the device 1' comprises a motor 8', which is adapted to cause the rotation of the whisk 3' with respect to the outer cylinder 2'. The whisk 3' turns around a guiding ball 42 which forms its axis of rotation. The motor 8' is provided in a separate chamber of the device 1' with a separation 13', e.g. a plate, between the motor 8' and the compartment containing the whisk 3' and the gap 6' through which the milk and air flow. The separation 13' is preferably water impermeable, so that milk cannot enter the part of the device 1', in which the motor 8' is located. The motor 8' has a shaft 9', which is rotated. The shaft 9' is 'provided with a head part 10', which is wider than the shaft 9' and includes at least one first magnet 11'. The whisk 3' is equally provided with at least one second magnet 12' arranged near its lower surface, which is configured and positioned such that it interacts magnetically with the at least one first magnet 11' arranged in the head part 10' of the motor 8'.

When the shaft 9' is rotated by the motor 8', the at least one first magnet 11' is also rotated and transfers its rotation through the magnetic coupling onto the at least one second magnet 12' of the whisk 3', thereby causing a rotation of the whisk 3'.

Preferably, all embodiments of the present invention are designed such that a shear stress value for the milk in the gap 6 that is in a range from 20 to 80 Pa, more preferably, 30 to 60 Pa, most preferably of 40 to 50 Pa is achieved, when assuming Newton's law of viscosity. The results in terms of milk foam quality depend not only on the instantaneous shear stress, but on the time during which this shear stress is applied. A typical value is 0.2 s at a shear stress of 40 to 50 Pa, but good results are also obtained with longer times. The preferred shear stress values can be achieved by a gap having a width w of preferably 0.1 to 1 mm, more preferably 0.2 to 0.6 mm, most preferably 0.3 to 0.5 mm, a rotation speed of preferably 1000 and 15000 rpm, more preferably 2000 and 10000 rpm, most preferably 4000 and 8000 rpm, an inner diameter o of the outer cylinder 2 of preferably 20 to 40 mm, more preferably 30, and by using milk that has at ambient temperature (20° C.). Milk at ambient temperature is assumed to have a viscosity of $\mu = 2$ mPa·s and is assumed to be a Newtonian fluid.

Figure 8:
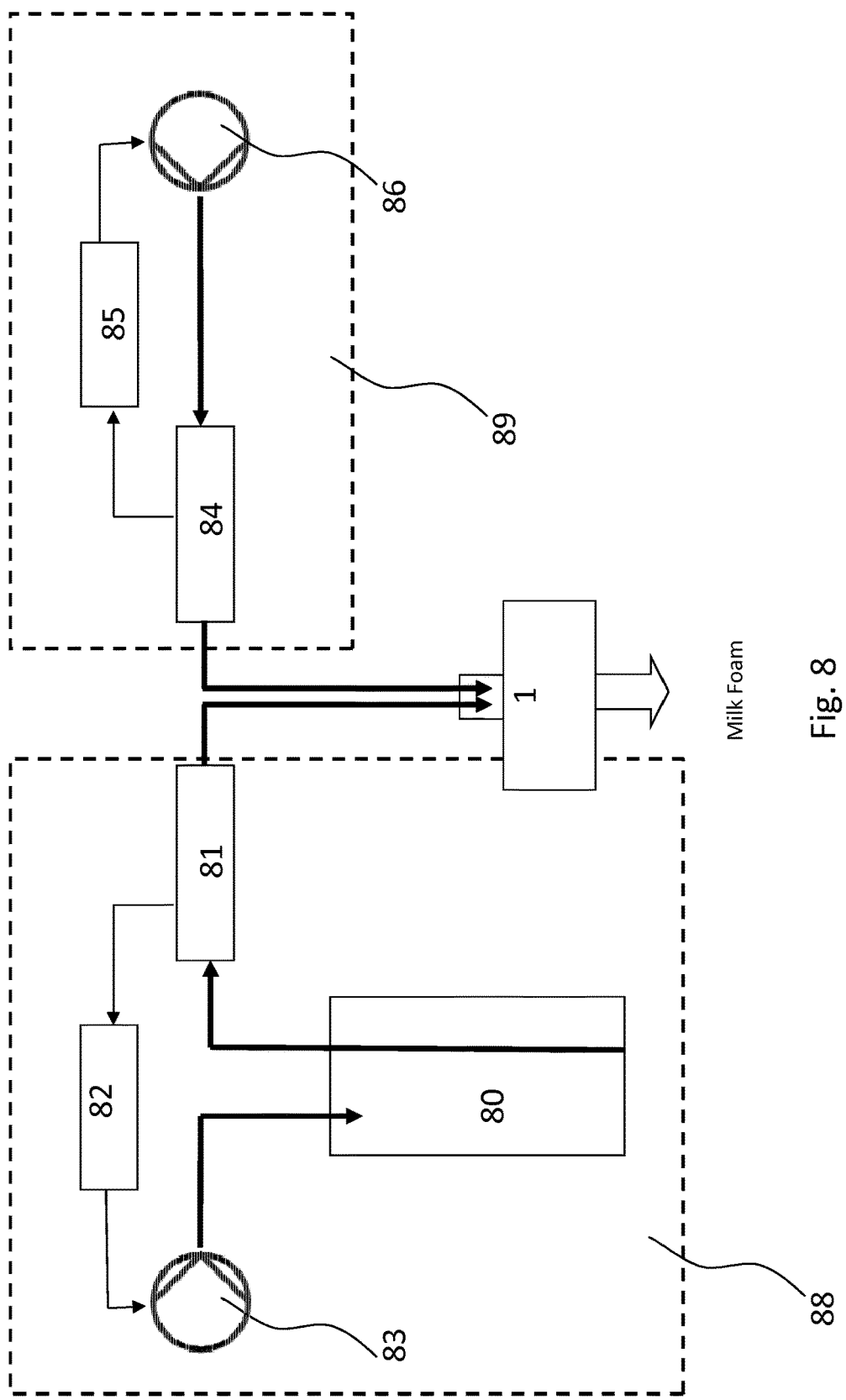
FIG. 8 shows a schematic of a device for producing milk foam according to the present invention including milk and air supply circuits.

FIG. 8 schematically shows the device 1 or 1' according to any of the previously described embodiments with a milk supply circuit 88 and air supply circuit 89. These circuits 88, 89 are part of the overall device, but have been omitted in FIGS. 3 to 7 for the sake of simplicity.

The milk supply circuit 88 comprises a milk tank 80 from which milk is pumped towards the inlet 4, 4' of the device 1 using an air pump 83. The air pump 83 simply pushes air into the milk tank 80, so that milk is pushed out of the tank 80 towards the inlet 4 of the device 1. A flowmeter 81 and a regulator 82, for example a PID regulator, form a feedback loop. The milk flow rate is compared to a target value, and the pump adjusted, typically by adjusting a voltage applied to the pump, if the measured value does not correspond to the target value. In the same way, the air supply is controlled via another regulator 85 using values provided by a flowmeter 84 and regulating another air pump 86.

Controlling the amount of air and milk supplied and supplying them through two different and independent tubes that are only joined at the entry of a mixing chamber, one can control the foam properties particularly well.

Depending on the desired foam properties (firmness, consistency, specific weight, etc.), a different ratio of milk and air can be chosen, so that a wider range of different foam recipes can be produced by the device. Typically the ratio of milk to air volume can range from 3:1 to 1:7. Target values for different milk and air flow rates corresponding to different recipes can be stored in a control unit of the device and used to regulate the flow accordingly depending on the desired recipe.

The invention claimed is:

1. A method for producing milk foam in a device comprising an outer cylinder, a rotatable element arranged within the outer cylinder, a fluid inlet and a fluid outlet, wherein the rotatable element is rotatable with respect to the outer cylinder, wherein a gap is formed between the outer cylinder and the rotatable element, the gap connecting the fluid inlet with the fluid outlet, and the device comprises a milk supply circuit supplying the fluid inlet with milk and an air supply circuit supplying the fluid inlet with air, the milk supply circuit and the air supply circuit being independent from each other, the method comprising:
    supplying the milk to the fluid inlet via the milk supply circuit and supplying air to the fluid inlet via the air supply circuit that is independent from the milk supply circuit, the fluid inlet directing a mixture of the milk and the air into the gap; and
    rotating the rotatable element using a motor of the device, the rotatable element is an inner cylinder arranged concentrically within the outer cylinder, the motor comprises a shaft provided with a head part that comprises at least one first magnet, and the rotatable element comprises at least one second magnet, the rotating of the rotatable element comprises transferring a rotation of the shaft onto the rotatable element using the at least one first magnet and the at least one second magnet without the shaft being mechanically connected to or inserted into the rotatable element, and the rotating of the rotatable element while the mixture of the milk and the air are positioned in the gap emulsify the mixture to produce the milk foam.

2. The method of claim 1, comprising controlling an air flow rate and a milk flow rate to target values stored in a memory of the device and associated with specific recipes.

3. The method of claim 1, wherein the outer cylinder has an inner wall, the inner cylinder has an outer wall, the inner wall and the outer wall form two parallel boundary plates, and the method comprises creating a Couette flow of a fluid in a space between the two parallel boundary plates based on relative movement of the inner cylinder against the outer cylinder.

4. The method of claim 3, comprising continuously receiving the milk from the fluid inlet in a space between the two parallel boundary plates.

5. The method of claim 1, wherein the rotatable element is a whisk arranged within the outer cylinder.

6. The method of claim 1, comprising rotating the rotatable element with a rotation speed of 4000 to 8000 rpm with respect to the outer cylinder.

7. The method of claim 1, wherein the fluid inlet leads directly into the gap such that the device forms a flow path consisting of the fluid inlet, the gap, and the fluid outlet.

8. The method of claim 1, wherein the device comprises a housing comprising the outer cylinder, the fluid inlet directs the air and the milk into the housing, and the fluid outlet directs the emulsified mixture out of the housing.

9. The method of claim 1, wherein the gap has a width in a radius direction of the inner cylinder and the outer cylinder in a range of 0.2 to 1.0 mm.

10. The method of claim 9, wherein the fluid outlet has a diameter larger than the width of the gap.

11. The method of claim 10, wherein the diameter of the fluid outlet is 2 to 10 mm.

12. The method of claim 1, wherein the gap has a width in a radius direction of the inner cylinder and the outer cylinder in a range of 0.3 to 0.6 mm.

13. The method of claim 12, wherein the fluid outlet has a diameter larger than the width of the gap.

14. The method of claim 13, wherein a ratio of the width of the gap to the diameter of the fluid outlet is between 1:5 and 1:30.

15. The method of claim 13, wherein the diameter of the fluid outlet is 2 to 10 mm.

16. The method of claim 13, wherein the diameter of the fluid outlet is 5 to 10 mm.

17. The method of claim 1, wherein a diameter of the outer cylinder is 25 to 35 mm.

18. The method of claim 1, wherein the rotating of the rotatable element while the mixture of the milk and the air are positioned in the gap subjects the mixture to a shear stress from 20 to 80 Pa.

19. The method of claim 1, wherein the rotating of the rotatable element while the mixture of the milk and the air are positioned in the gap subjects the mixture to a shear stress from 30 to 60 Pa.

20. The method of claim 1, wherein the rotating of the rotatable element while the mixture of the milk and the air are positioned in the gap subjects the mixture to a shear stress from 0 to 50 Pa.

* * * * *